(12) United States Patent
Stumpe

(10) Patent No.: US 7,044,431 B2
(45) Date of Patent: May 16, 2006

(54) ELECTROMAGNETICALLY ACTUATED VALVE SYSTEM AND VALVE DEVICE

(75) Inventor: Werner Stumpe, Stuttgart (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 25 days.

(21) Appl. No.: 10/381,283

(22) PCT Filed: Sep. 19, 2001

(86) PCT No.: PCT/EP01/10795
§ 371 (c)(1),
(2), (4) Date: Sep. 22, 2003

(87) PCT Pub. No.: WO02/25155
PCT Pub. Date: Mar. 28, 2002

(65) Prior Publication Data
US 2004/0056222 A1 Mar. 25, 2004

(30) Foreign Application Priority Data
Sep. 22, 2000 (DE) .......................... 100 46 979

(51) Int. Cl.
*B65B 1/04* (2006.01)

(52) U.S. Cl. .............................. 251/30.01; 137/596.14; 137/596.16; 137/596.18

(58) Field of Classification Search ............ 137/596.14, 137/596.16, 596.18; 251/30.01, 30.02, 129.01; 91/465
See application file for complete search history.

(56) References Cited

U.S. PATENT DOCUMENTS 4,345,620 A * 8/1982 Ruchser et al. ........ 137/596.16
4,617,861 A 10/1986 Lichtenberg
4,893,645 A 1/1990 Augustinas et al.
6,062,260 A * 5/2000 Yoshimura et al. .... 137/596.16

FOREIGN PATENT DOCUMENTS

| DE | 38 23 569 | 1/1990 |
|----|-----------|--------|
| DE | 39 31 761 | 4/1991 |
| EP | 0 095 782 | 12/1983 |
| EP | 0 145 858 | 6/1985 |
| EP | 0 305 710 | 3/1989 |

OTHER PUBLICATIONS

International Search Report, (Sep. 19, 2001).

* cited by examiner

*Primary Examiner*—Steven O. Douglas
(74) *Attorney, Agent, or Firm*—Crowell & Moring LLP

(57) ABSTRACT

The invention relates to a valve system comprising a housing, an actuator, a main valve disposed between an inlet chamber and an outlet chamber, and a pilot chamber. Said pilot chamber is linked with the outlet chamber via a main valve, comprising at least one pilot valve member and one valve body linked with the electromagnetic actuator, and with the inlet chamber via at least one connecting channel. The invention is characterized in that the stationary seat of the main valve is formed by an insert that is mounted in the; housing of the valve system. The main valve member is impinged upon on its diametrically opposed surfaces by the pressure present in the inlet chamber and the pressure present in the pilot chamber. The pilot chamber is linked with the inlet chamber via a connecting channel that extends through the main valve member. The pilot valve member is formed by the insert mounted in the housing of the valve system or by the housing. The connection to the outlet chamber is made via at least one connecting channel disposed in the housing or in the insert.

30 Claims, 2 Drawing Sheets

ELECTROMAGNETICALLY ACTUATED VALVE SYSTEM AND VALVE DEVICE

BACKGROUND AND SUMMARY OF THE INVENTION

The invention relates to an electromagnetically actuated valve system and to a combined valve device.

An electromagnetically actuated valve system for ensuring different functions is known from European Patent document EP 0 305 710 A2. The combination of such valve systems, i.e., a first electromagnetically actuated valve system and a second electromagnetically actuated valve system, to form a combined valve device is also revealed in that patent document. In this case, the two are integrated in a jointly usable housing. The first electromagnetically actuated valve system is used for controlling the connection between a pressure medium source and a consuming device or a consuming device arrangement, that is, a plurality of consuming devices, whereas the second valve system is used for controlling the pressure relief of the consuming device or the consuming device arrangement.

The two valve systems of the combined valve device preferably have an identical construction in order to achieve a high degree of standardization with respect to the further development of the individual elements. The first valve system has an inlet chamber, which can be connected with the pressure medium source by way of a corresponding connection, and a working chamber, which can be connected with a consuming device or a consuming device arrangement. A main valve is arranged between the two chambers. This main valve consists of a movable valve member and a valve seat fixed to the housing. In addition to the inlet chamber and the working chamber, a pilot chamber and a compensation chamber are provided in the housing of the first valve system.

For controlling the movement of the main valve member, a control element is provided. The control element is constructed such that it is acted upon by the inlet pressure on a first surface assigned to the inlet chamber in the opening direction of the main valve, while the pressure in the pilot chamber is applied to a second surface of the control element assigned to the pilot chamber in the closing direction of the main valve. In this case, the second surface is larger than the first surface. The pilot chamber can be connected with the working chamber by means of a pilot valve. The pilot valve is formed of a movable pilot valve member and a pilot valve body connected with the armature of the actuating magnet.

The main valve member and the pilot valve member are fixedly coupled in such a manner that a movement of the main valve member in the opening direction of the main valve is simultaneously a movement of the pilot valve member in the closing direction of the pilot valve. The pilot chamber is connected with the inlet chamber by means of a throttle connection. The throttle connection is dimensioned such that, when the opening cross-section of the pilot valve is small, this throttle connection permits at least an identically large pressure medium throughput into the pilot chamber as the pilot valve out of the pilot chamber and, when the opening cross-section of the pilot valve increases, a lower pressure medium throughput into the pilot chamber than the pilot chamber valve from the pilot chamber.

The second valve system, which preferably is constructed analogous to the first valve system with respect to the control element, the actuating device and the method of operation of the main valve and the pilot valve, has a working chamber connected with the consuming device system, which, when the valve device is combined, simultaneously represents the outlet chamber of the first valve system, and an outlet chamber connected with an outlet between which a main valve is arranged. The main valve consists of a valve seat fixed to the housing and a movable main valve member, the outlet being connected at least indirectly with a pressure relief space. Furthermore, analogous to the first valve system, a control device controlling the movement of the main valve and a pilot chamber are provided. The control element is acted upon by the consuming device pressure on a first surface assigned to the working chamber in the opening direction of the main valve. On a second surface assigned to the pilot chamber, the control element is acted upon by pressure in the pilot chamber in the closing direction of the main valve. In this case, the second surface is also larger than the first surface. The pilot chamber can be connected with the outlet chamber by means of a pilot valve. The pilot valve is formed by a movable pilot valve member and a pilot valve body connected with the armature of the actuating magnet. In this case, the main valve member and the pilot valve member are fixedly coupled in such a manner that a movement of the main valve member in the opening direction of the ma in valve simultaneously is a movement of the pilot valve member in the closing direction of the pilot valve. The pilot chamber is connected by way of another throttle connection with the outlet chamber, that is, in this case, the relief chamber.

The valve systems disclosed in this document require high constructive expenditures and intensive mounting. In particular, the constructions according to European Patent document EP 0 305 710 A2 contain a control system with a valve and a switching piston at the ends. In this case, the thinner part of the control device is guided through a partition For ensuring the power transmission, the individual components are riveted tom one another. The construction of the control device increases the required space for the individual valve system. Furthermore, it is impossible with respect to a valve system according to the above-mentioned document to check the valve seats without destroying the individual valve systems or the combined valve, device. The replacement of the elastic valve seat of the main valve also causes high expenditures. During repairs or servicing, damage to other—originally not affected parts—cannot be excluded. The maintenance of this valve system is therefore risky. For this reason, in the event of damage—irrespective of the extent of the damage—, it is therefore always recommended that the complete valve system or even the complete valve device be exchanged.

Another embodiment of a combined valve device is contained in European Patent document EP 0 145 858. This document has openings in the control piston, which openings are monitored by means of a magnetic valve. By means of the 3/2-magnetic valves, the control chambers can be joined to the input pressure or to the pressure which is in each case situated on the output side.

From European Patent document EP 0 095 782, a compact control valve for hydraulic precision control is known, which comprises a pilot valve and a main valve; however, the main valve member simultaneously forms the valve seat for the pilot valve body; that is, the pilot valve member. The two are coupled with one another with respect to their function; particularly, the actuating of the main valve simultaneously causes an actuating of the pilot valve. The valve seat of the main valve is formed by a housing bore in which the pilot valve member is guided. Repairs require the complete demounting of the valve device. Damage to the main valve seat requires an exchange of the entire device.

The construction according to German Patent document DE 39 31 761 A1 involves a valve system comprising a pilot valve which is spatially separated by an insert having control and connection bores and can be functionally coupled with one another by way of this insert. Although this solution has the advantage of a simple exchangeability of the two mutually coupled valve systems, exchange and servicing operations always require a complete demounting of the individual valve system—relay valve or control valve.

It is therefore an object of the invention to provide a valve system and, particularly, a combined valve device for the sensitive control of the connection between a pressure medium source and a consuming system, as well as for controlling the pressure relief of the consuming system, which valve system and valve device is mounting-friendly and maintenance- or repair-friendly. While the fluid throughput and, particularly, the air throughput remains the same or is increased, the required constructional volume is to be reduced. Another aspect consists of the easy manufacturing of the elements of the individual valve systems and, particularly, of the combined valve device. The requirement concerning the repair-friendliness includes the possibility of checking the quality of valve pairings, so that, when the finding is positive, a continued use of the already operating valve pairings should be possible. When an exchange is required, only the defective parts would then have to be replaced while the undamaged components remain in use.

The solution according to the invention is characterized in that the pilot chamber is assigned to the main valve member such that the main valve member, at least in a partial area of its surfaces oriented in a mutually opposed manner viewed in the flow direction of the pressure medium, is in each case acted upon by the pressure existing in the inlet chamber and the pressure existing in the pilot chamber. The pilot chamber is connected by way of at least one connecting duct extending through the structural element forming the main valve member with the inlet chamber. The structural element, which forms the main valve member, and the pilot valve member are free of a constructional coupling with one another. The stationary seat of the main valve is formed by an insert, which can be clamped into the housing of the valve system. The pilot valve member is formed by the insert, which can be clamped into the housing of the valve system or by the housing, the connection between the pilot valve and the outlet chamber taking place by way of at least one connecting duct arranged in the housing or in the insert. A combined valve device has a first valve system, particularly an electromagnetically actuated valve system, characterized in that the inlet chamber can be connected with a pressure medium source, and the outlet chamber forms a working chamber which can be coupled with a consuming device, and a second valve system, particularly an electromagnetically actuated valve system, characterized in that the inlet chamber is formed by a working chamber, which can be coupled with a consuming device, and the outlet chamber can be connected with a relief space. Advantageous further developments are in each case indicated in the subclaims.

The electromagnetically actuated valve system comprises an electromagnetic actuator; a main valve member which is arranged between an inlet chamber and an outlet chamber and has a main valve member and a stationary valve seat; furthermore, a pilot chamber which is connected with the outlet chamber by way of a pilot valve. The pilot valve comprises a valve element and a valve body which is connected with an armature of the electromagnetic actuator, which armature is linked with an actuating magnet. The main valve member and the pilot valve member are free of a mutual constructional coupling; that is, that a movement of the main valve member in the opening direction of the main valve in comparison to a valve system of the above-mentioned type, is not simultaneously a movement of the pilot valve member in the closing direction of the pilot valve. The main valve member is formed by a structural member which is also called a closing body. According to the invention, the stationary seat for the main valve member is formed by an at least two-part insert, which can be arranged in the housing of the electromagnetically actuated valve system. By means of corresponding sealing devices, the closing body, together with the insert and possibly the housing, forms the pilot chamber, the pilot chamber being arranged such that the pressure therein acts upon the main valve member on the face pointing away from the inlet chamber. The coupling between the inlet chamber and the pilot chamber takes place by way of at least one axial duct extending through the closing body. The pilot valve member is formed by an at least two part insert, which can be clamped into the housing of the valve system, or by the housing, the connection between the pilot valve and the outlet chamber taking place by way of at least one connecting duct arranged in the housing and/or in the insert.

The pilot chamber has a pressure-medium tight construction with respect to the inlet chamber and outlet chamber. The two valves of the valve system—the main valve and the pilot valve—are arranged parallel or side-by-side, that is, in two parallel planes.

By means of providing the at least two-part insert, the assignment of the pilot chamber to the closing body and the construction of the connecting ducts in the functional elements, that is, in the closing body forming the main valve member and in the insert or housing part forming the pilot valve member, a valve system is created which is easy to mount and demount and which simultaneously is very servicing- and repair-friendly, in which case it does not necessarily have to be expected that adjacent structural elements will be damaged during the demounting. Since the construction of the surfaces required for generating the valve pairings takes place on different elements, an exchange of the defective components can be carried out independently of the further utilization of the other valve pairings. Because of the very compact method of construction in the axial direction, that is, in the inflow direction viewed from the inlet or the inlet chamber, and the combination of the functional units in a very narrow space, the required constructional volume could be considerably reduced while the fluid throughput, particularly the air throughput, remains the same or is increased.

The electromagnetically actuated valve system designed according to the invention is suitable for implementing many different tasks. Corresponding to the arrangement in pneumatic circuits or the assignment to individual elements of such a circuit, this valve system can be used either as 1) a control valve for controlling the connection between a pressure medium source and of a consuming device (which is not shown), or as 2) a pressure relief valve for controlling the pressure relief of one consuming device or several consuming devices.

In the former case, the inlet chamber can be coupled with a pressure medium source, while the outlet chamber operates as a working chamber and is coupled with a consuming device. In the latter case, the inlet chamber is formed by the working chamber which is coupled with a consuming device while the outlet can be connected with a relief space.

Under another aspect of the invention, it is, however, also possible to assign a valve system designed according to the invention to an arbitrary convention valve system such that either the task mentioned in 1. or the task mentioned in 2. is carried out by the valve system.

The two valve systems are preferably combined in a combined valve device for carrying out the two above-mentioned tasks. In this case, the construction and the design of the individual elements of the main and pilot valves preferably take place in an identical manner. This has the advantage that a high degree of uniformly designed component elements is produced, which is advantageous particularly also when individual elements have to be exchanged, since the storage is reduced because of the small number of structural elements. For this purpose, two electromagnetically actuated valve systems designed according to the invention are combined in a housing, which has three connections, specifically an intake which can be coupled with a pressure medium source; a discharge which is at least indirectly coupled to a consuming device; and a relief connection which is at least indirectly connected with a relief space. For this reason, the discharge of the first valve system and the intake to the second valve system are formed by a joint connection to the consuming device; that is, one connection is utilized jointly. On the one hand, this combined valve system is used for controlling the connection between the intake from the pressure medium source to the consuming device and, on the other hand, for controlling the pressure relief in the working chamber coupled with the consuming device. The two valve systems have an identical construction with respect to the actuator and the closing body. However, differences exist with respect to the inserts in the joint housing because the boundary between the two valve systems is not formed by the housing wall but by the insert or one of the inserts. The inserts preferably have multipart constructions for each valve system in order to permit an easy mounting and demounting of the individual elements of the valve system, particularly of the closing body. The closing body itself is constructed as a piston element which, for forming the main valve, has an end area which is widened in a piston-type manner and which in each case, corresponding to the type of valve system, is acted upon on its face—first valve system or second valve system—by the pressure in the inlet chamber or by the pressure in the working chamber. The connection between the inlet chamber and the pilot chamber takes place by a duct extending in the axial direction through the closing body. This duct is therefore used for forming a constant throttle in the inlet area into the axial duct at the closing body. As a result of the corresponding actuation of the pilot valve body, which is coupled with an armature element of the electromagnetic actuator, a controllable throttle is formed which is connected behind the constant throttle.

The two valve systems—the first valve system and the second valve system—each have an electromagnetic actuator. This actuator comprises at least one actuating magnet, which is connected with an armature. The armature, in turn, is at least indirectly, preferably directly, connected with the valve body of the pilot valve device. With respect to the method of operation and thus the achieving of the individual functional positions of the pilot valve device of each valve system, essentially the following two possibilities are available:

1. Selection of an actuating magnet with an ascending stroke/current characteristic; that is, the valve body is pulled into the corresponding functional position.

2. Construction of the actuating magnet with a descending stroke/current characteristic; that is, implementation of the functional positions of the valve body by pressure.

When combining the two valve systems in a combined valve device, the two valve systems are preferably used with an identical actuator so that the positions required for the implementation of the method of operation of the combined valve system are implemented either by energizing or non-energizing an individual armature element. The utilization of this possibility has the advantage that the degree of standardization for the further development of such valve systems for different application purposes and a use in a combined valve device can be increased considerably. This has the additional advantage that, in the event of a possibly required exchange, particularly in the case of combined valve systems, no attention has to be paid to different actuators.

The concrete further development of the individual elements of the individual valve systems may also take place differently. However, preferably at least the closing body is constructed symmetrically with respect to an axis. The closing body is constructed as a piston element; that is, as an element which has different dimensions in the cross-sectional view. For forming the pilot chamber and for an easy mounting and demounting, the insert is constructed in several parts, preferably in two parts.

A plurality of possibilities exists with respect to the construction of the inserts. In the case of a construction as an individual valve system, that is, with only one closing body and one actuator, these inserts preferably have a symmetrical construction for being used between an intake and a discharge. In the simplest case, a two-part construction is also selected here. In this case, the partial insert element, which is first in the inflow direction from the intake, forms the valve seat of the main valve. For forming the pilot chamber, a sealing device is provided between the face of the closing body directed away from the intake in the area of the formation of the main valve, which sealing device rests against this surface, and is fastened to the insert, either on the first partial insert element or on the second partial insert element. This sealing device is preferably constructed as an elastic membrane. Sealing devices are preferably also provided between the main valve seat and the surfaces on the main valve member, which enter into an operative connection with the main valve seat. These sealing devices may be arranged either on the stationary valve seat or on the closing body. The arrangement preferably takes place on the closing body.

When the insert is constructed in two parts, the second partial insert element, viewed in the inflow direction from the intake, is arranged behind the first and forms additional boundary walls of the pilot chamber. The connection between the pilot valve and the outlet takes place by way of corresponding passage openings in the housing or at the insert, preferably the first and the second partial insert element outside the area of the pilot chamber.

In the case of the construction as a combined valve device, that is, the combination of the two valve systems and the assignment to the three above-mentioned connections, the further development of the inserts takes place such that here also a degree of standardization is achieved which is as high as possible; that is, the proportion of the elements with an identical construction is as high as possible.

The embodiment is particularly advantageous in the case of a combined valve device, in which the membrane used for forming the pilot chamber extends over both valve systems and thus is arranged, for example, clamped, between the first and the second partial insert element of the inserts for the first and the second valve system. For connecting the individual pilot valves with the corresponding outlets, that is, the first pilot valve device with the working chamber and the second pilot valve device with the relief space, at least one corresponding opening is provided in the sealing device, for example, in the form of passage openings.

In the case of a construction or combination of two valve systems designed according to the invention to form a combined valve system with three connections, according to another aspect of the invention, the valve system can be supplemented by additional structural elements in order to carry out additional functions. The integration of devices for detecting a condition parameter, particularly of the pressure in the working chamber to the consuming device, for example, is conceivable in this case. As a rule, this is implemented as a pressure sensor. It is advantageous that, by a coupling with the corresponding electronic system, particularly the linkage to or integration in a control device, this condition parameter, particularly the pressure, can be regulated.

A further development consists of, in addition to the pressure sensor, integrating an electronic control device in the combined valve system. This integration permits the creation of a compact, easily mountable and repair-friendly pressure control module, which can be offered as a completely merchantable unit.

The solution according to the invention will be explained in the following by means of figures.

DETAILED DESCRIPTION OF THE DRAWINGS

Figure 1:
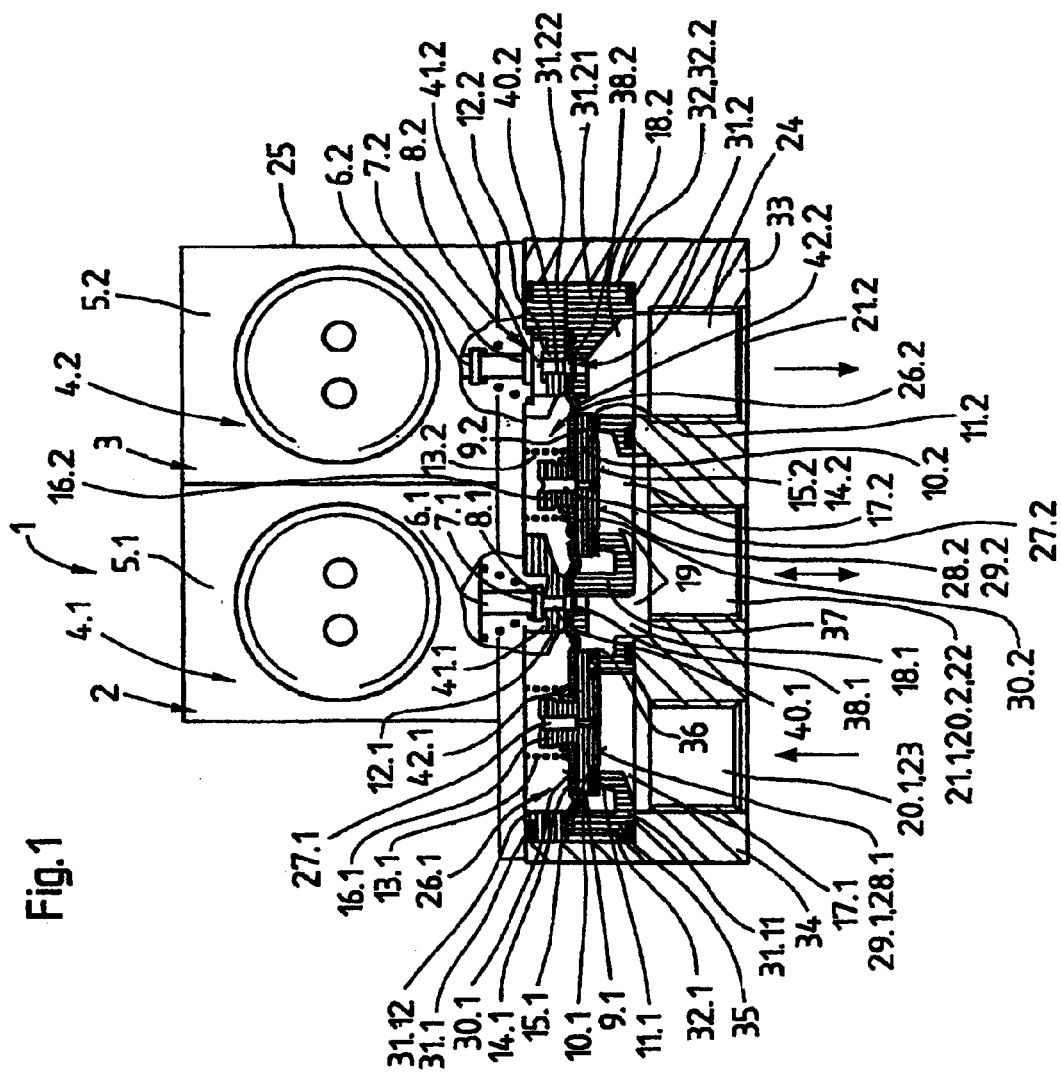
FIG. 1 is a sectional view of an embodiment of valve systems designed according to the invention in a combined valve device.

In an axial sectional view, FIG. 1 illustrates an advantageous embodiment of a combined valve device 1. This valve device 1 comprises two valve systems—a first valve system 2 and a second valve system 3, the first valve system 2 in the combined valve device 1 acting as an inlet valve and the second valve system 3 acting as an outlet valve, for controlling the connection between a pressure medium source, which is not shown, and a consuming device, which is also not shown, or a consuming system as well as for controlling the pressure relief at the consuming device.

The two valve systems—the first valve system 2 and the second valve system 3—are constructed as electromagnetically actuated valve systems. The first valve system 2, that is, the inlet valve system, and the second valve system 3, that is, the outlet valve system, for this purpose, contain devices 4.1 and 4.2 respectively for the electromagnetic actuation. The devices 4.1 and 4.2 respectively for the electromagnetic actuation of the first valve system 2 and of the second valve system 3 respectively each have an actuating magnet 5.1 for the devices 4.1 for the electromagnetic actuation and 5.2 for the devices 4.2 for the electromagnetic actuation and an armature 6.1 and 6.2 respectively.

Each valve system—the first valve system 2 and the second valve system 3—comprises a pilot valve, which has the reference number 8.1 for the first valve system 2 and the reference number 8.2 for the second valve system 3, and a main valve 9.1 and 9.2 respectively. Each main valve 9.1 and 9.2 has at least one main valve member 10.1 and 10.2 respectively, and a stationary valve seat 11.1 and 11.2 respectively, while each pilot valve 8.1 and 8.2 comprises a pilot valve member 12.1 and 12.2 respectively and a pilot valve body 7.1 and 7.2 respectively coupled with the armature 6.1 and 6.2 respectively of the actuating magnets 5.1 and 5.2 respectively.

The main valve members 10.1, 10.2 and the pilot valve members 12.1 and 12.2 of each valve system—first valve system 2 and second valve system 3—are arranged spatially separated from one another in two different structural elements. In this case, no coupling exists between a movement of the main valve member 10.1 and 10.2 respectively in the opening direction of the main valve 9.1 and 9.2 respectively with the movement of the pilot valve member 12.1 and 12.2 respectively in the closing direction of the pilot valve 8.1 and 8.2 respectively. The main valve member 10.1 and 10.2 respectively is formed by a closing body 14.1 and 14.2 respectively. The closing body 14.1 and 14.2 respectively comprises a piston element 15.1 and 15.2 respectively which, with the stationary seat 11.1 and 11.2 respectively, forms the main valve 9.1 and 9.2 respectively. Viewed in the axial direction, that is, in the flow direction, the closing body 14.1 and 14.2 respectively is constructed with a different cross-section, so that a shaft 16.1 and 16.2 respectively is also arranged on the piston element 15.1 and 15.2 respectively. In this case, the shaft 16.1 and 16.2 respectively has the function of fixing the sealing elements described below as well as the supporting spring device 13.1 and 13.2 respectively. By way of this supporting spring device 13.1 and 13.2 respectively, the closing body 14.1 and 14.2 respectively is supported on the housing 25 of the combined valve device 1.

Each valve system—first valve system 2 and second valve system 3—comprises an inlet chamber 17.1 and 17.2 respectively and an outlet chamber 18.1 and 18.2 respectively which can be coupled with corresponding connections. The main valves 9.1 and 9.2 are arranged between the corresponding inlet chambers 17.1 and 17.2 respectively and the outlet chambers 18.1 and 18.2 respectively. Each of the charmers—inlet chambers 17.1, 17.2 and outlet chambers 18.1, 18.2—is coupled with connections; here, a first connection 20.1 for the inlet chamber 17.1 and a second connection 21.1 for the outlet chamber 18.2 of the first valve system 2 as well as a first connection 20.2 for the inlet chamber 17.2 and a second connection 21.2 for the outlet chamber 18.2 of the second valve system 3.

In the illustrated case of the combined valve device 1, the outlet chamber 18.1 of the first valve system 2 and the inlet chamber 17.2 of the second valve system 3 are combined and form a working chamber which can be coupled with the consuming device. In addition to the combination of the inlet 17.2 of the second valve system 3 and the outlet chamber 18.1 of the first valve system 2, the connections involved therewith—the second connection 21.1 of the first valve system 2 and the first connection 20.2 of the second valve system 3—are combined to form a connection 22. The first connection 20.1 of the first valve system 2 is formed by an intake 23 which can be coupled with a pressure medium source. The second connection 21.1 of the first valve system 2 and thus connection 22 of the combined valve device 1 is formed by a connection to the consuming device. For relieving pressure, the first connection 20.2 of the second valve system 3 is also formed by connection 22 to the consuming device, while the second connection 21.2 of the second valve system 3 represents a connection 24 to a relief space. In the term "connection" should not only be understood to already be an element of a form- and/or force-locking connection with corresponding lines or ducts; the term "connection" is used here only to indicate the function, that is, the providing of a possibility of a coupling with a pressure medium source, a consuming device, etc. In this case, the housing 25 of the combined valve device 1 has three connections: the intake 23, which can be coupled with the pressure medium source; the connection 22 to the consuming device, which is ventilated for the supply and bled for the bleeding; and a connection 24 for the bleeding which is also indicated to be a connection for a coupling with a relief space. It is also conceivable, but not shown here in detail, to connect the second connection 21.1 of the first valve system 2 and the first connection 20.2 of the second valve system 3 not directly but by means of a module with one another, which module is not shown here and which represents a connecting block for individual ducts and, as an output, contains the connection to the consuming device.

One pilot chamber 26.1 and 26.2 respectively is assigned to each pilot valve 8.1, 8.2. In this case, the pilot chamber 26.1 is connected with the first connection 20.1 of the first valve system 2, that is, the intake 23 or the inlet chamber 17.1 coupled with the first valve system 2; whereas the pilot chamber 26.2 of the second valve system is coupled with the first connection 20.2 of the second valve system 3, which is formed by the connection 22 to the consuming device, or the working chamber 19. The coupling takes place by means of at least one connecting duct 27.1 and 27.2 respectively, which extends through the closing body 14.1 and 14.2 respectively to the pilot chamber 26.1 and 26.2 respectively.

In this case, the pilot chambers 26.1 and 26.2 are arranged in such a manner that, by way of these, a counterpressure is generated to the pressure in the inlet chamber 17.1 at the main valve 9.1 or the working chamber 19 at the main valve 9.2 of the second valve system 3. At least a partial area 28.1 of the face 29.1 of the main valve 9.1 oriented to the inlet chamber 17.1 is acted upon by pressure from the inlet chamber 17.1, while the pressure in the pilot chamber 26.1 acts upon the face 30.1 on the first closing body 14.1 pointing away from the inlet chamber 17.1. Analogously, this statement applies to the second valve system 3. This involves the partial area 28.2 which, on the face 29.2 directed to the working chamber 19, is acted upon by the pressure in the working chamber 19, whereas the pressure in the pilot chamber 26.2 acts upon the face 30.2 directed away from the working chamber 19. The connection between the pilot chamber 26.1 and the inlet chamber 17.1 or the working chamber 19 and the pilot chamber 26.1 takes place by way ducts, preferably at least one duct respectively,—the connecting duct 27.1 at the first closing body 14.1, and 27.2 at the second closing body 14.2. The latter preferably extends parallel to the intake 23 or connection 22 to the consuming device. A sloped construction with respect to the flow direction in the intake or with respect to the connection to the consuming device 22 is also conceivable but, as a rule, is not endeavored. The duct 27.1 and 27.2 respectively preferably has a uniform cross-section along its length, so that this duct takes over the function of a constant throttle between the inlet chamber 17.1 and the pilot chamber 26.1 or the working chamber 19 and the pilot chamber 26.2. In addition to being acted upon by the pressure from the pilot chamber 26.1 and 26.2 respectively, the closing body, 14.1 and 14.2 respectively is acted upon on its face 30.1 and 30.2 respectively directed away from the inlet chamber by the force of a supporting spring device 13.1 and 13.2 respectively. This supporting spring device 13.1 and 13.2 respectively is supported on the housing 25. The supporting spring device is constructed as a pressure spring device.

The pilot valve 8.1 and 8.2 respectively operates as a controllable throttling device. The latter is in each case formed by the pilot valve members 12.1 and 12.2 and the pilot valve bodies 7.1, 7.2, which are each connected with the armatures 6.1, 6.2 and the actuating magnets 5.1, 5.2. In the illustrated case, the two actuating magnets 5.1 and 5.2 respectively of the two valve systems are shown in the non-energized condition. This condition is characterized in that the first valve system 2 is closed and thereby blocks the intake 23, while the second valve system 3 is open, so that a linkage exists between the connection to the consuming device 22 and the atmosphere or a relief space 24, in which case the main valve 9.2 is, however, shown in the closed condition. The additional conditions will be explained by means of the description of functions which follows below.

According to the invention, in addition to the spatial separation and the housing in different constructional units of the constant throttle and the controllable throttle in the form of the pilot valve 8.1 and 8.2 respectively, the individual elements—main valve 9.1, 9.2 and pilot valve device 8.1, 8.2 of the two valve systems—first valve system 2 and second valve system 3—are each clamped by means of an at least two-part insert 31.1 and 31.2 respectively in a pressure-medium-tight manner into the housing 25. The individual elements of each two-part insert 31.1 and 31.2 each have the reference number 31.11 and 31.12 respectively for the two-part insert 31.1, and 31.21 and 31.22 respectively for the two-part insert 31.2. The inserts 31.1 and 31.2 respectively are integrated in the housing 25 and laid out and arranged such that they are supported on the interior walls 32 of the housing 25, particular on the interior wall area 32.1 of the housing as well as an interior wall area 32.2 of the housing, which is formed by a covering element 33 which, together with a housing base element 34, forms the housing 25.

In the first valve device 2 for controlling the connection between a pressure medium source, which is not shown, and a consuming device system, which is also not shown, the main valve 9.1 is arranged between an inlet chamber 17.1, which adjoins the intake 23 by means of the pressure-medium source, and a working chamber 19 connected with the consuming device by way of the connection 22 to the consuming device. In this case, the stationary valve seat 11.1 and 11.2 respectively is formed by the two-part insert 31.1 and 31.2 respectively, particularly the first partial insert element 31.11 of the first insert 31.1 and 31.21 respectively in the second valve system 3. The first partial insert element 31.11 of the insert 31.1 of the first valve device 2 which, in the flow direction from the intake 23 to the connection 22 to the consuming device, is arranged in front of the second partial insert element 31.12, has a projection 35 for this purpose, which, together with at least one partial surface 36, forms the valve seat 11.1. The closing body 14.1, which is constructed in the form of a piston element 15.1, can come to rest against the valve seat 11.1 by means of its surface 29.1 directed to the intake 23. According to the invention, the pilot valve member 12.1 and 12.2 respectively is integrated in the insert 31.1 and 31.2 respectively. In this case, the integration essentially takes place in the second partial insert element 31.12 and 31.22 respectively. The connection to the outlet chamber 18.1 of the first valve system 2 and 18.2 of the second valve system 3 respectively takes place by way of connection ducts 40.1 and 40.2 respectively which extend from the valve member 12.1 and 12.2 respectively, that is, the outer circumference 41.1 and 41.2 respectively of the second partial insert elements 31.12 and 31.22 respectively through at least the second individual element 31.12 and 31.22 respectively in the direction toward the outlet chamber.

Since the two-part insert is preferably constructed such that the individual partial insert elements 31.11, 31.12 and 31.21, 31.22 respectively are arranged behind one another in the axial direction and are supported on one another, the connecting duct 40.1 and 40.2 respectively extends not only through the second partial insert element 31.12 and 31.22 respectively but also through the first partial insert element 31.22 and 31.12 respectively. In the case of the combined valve device illustrated in FIG. 1, for space-saving reasons, the mutually adjoining walls of the partial insert elements 31.22 31.21 and 31.11, 31.12 are combined. This means that one wall of one of the two two-part inserts 31.1 or 31.2 is also formed by the other insert 31.2 and 31.1 respectively. In the illustrated case, the intermediate walls 37 which are provided between the two main valve members 9.1 and 9.2, particularly the two closing bodies 14.1 and 14.2, and which are formed by the partial insert elements of the inserts 31.1 and 31.2 respectively, are formed by the insert 31.1.

In this case, the pilot chamber 26.1 is formed between the insert 31.1 and the closing body 14.1; the pilot chamber 26.2 is formed between the second insert 31.2 and the closing body 14.2. For this purpose, a sealing device 42.1 and 42.2 respectively is provided between the first partial insert element 31.11, the second partial insert element 31.12 of the first insert 31.1 and the face 30.1 of the closing body 14.1 pointing away from the intake 23 or the inlet chamber 17.1. In the illustrated case, the sealing device 42.1 and 42.2 respectively is constructed as a membrane and is fastened on the side of the insert 31.1 between the first and the second partial insert element 31.11 and 31.12 respectively. It is, however, also conceivable that the sealing device 42.1 is fastened only to the second partial insert element 31.12 of the first insert 31.1 as well as the face 30.1 of the closing body 14.1 pointing away from the intake 23 or the inlet chamber 17.1. Furthermore, the pilot chamber is bounded by the interior housing wall 32, a connection existing between the pilot chamber 26.1 and the pilot valve device 8.1.

Analogously, the statements concerning the construction of the pilot chamber 26.2 and the sealing devices required for this purpose apply also to the second valve system 3.

The two valve systems—the first valve system 2 in the form of the inlet valve and the second valve system 3 in the form of the outlet valve—operate according to the same principle, i.e., the nozzle baffle plate principle. In this case, controllable resistors are used for adjusting pressures. The description predominantly applies to a valve.

The first valve system 2, particularly the main valve 9.1, is connected to the supply pressure for the inlet chamber 17.1. As a result of the constant throttle in the form of the connection duct 27.1 in the closing body 14.1, this supply pressure, that is, the pressure in the inlet chamber 17.1 also exists in the pilot chamber 26.1. Since the pressure in the chamber leading to the consuming device, that is, the working chamber 19, in this case, is lower than or maximally equal to the supply pressure, that is, the pressure in the inlet chamber 17.1, when the pilot valve 8.1 is closed, the main valve 9.1 of the first valve system 2 also remains closed. For increasing the pressure in the chamber leading to the consuming device, that is, the working chamber 19, the actuating magnet 5.2 of the second valve system 3 is energized. This results in a closing of the pilot valve 8.2 of the second valve system 3, that is, a closing of the controllable throttling device. When the actuating magnet 5.1 of the first valve system 2 is energized, the controllable throttling device in the form of the pilot valve device 8.1 will open. The fluid from the pilot chamber 26.1 flows by way of the pilot valve 8.1 to the working chamber 19. By way of the constant throttle, that is, the connecting duct 27.1 at the closing body 14.1, fluid follows from the inlet chamber 17.1. From the opening ratio of the two throttles—the constant throttle and the throttle formed by the opening of the valve device 8.1—with respect to one another, a pilot pressure occurs in the pilot chamber 26.1. The pressures acting upon the face 30.1 pointing away from the inlet chamber and the face 29.1 pointing toward the inlet chamber and thereby applied forces balance the closing body 14.1. If the pilot valve 8.1 is completely opened at the beginning, the pressure in the pilot chamber 26.1 is immediately reduced to a relatively low pressure. The equilibrium of forces at the closing body 14.1 is disturbed. The inlet main valve 9.1 is opened up. The fluid flows from the supply, that is, the inlet chamber 17.1 directly into the working chamber 19 coupled with the consuming device. In this condition, the fluid flows from the inlet chamber 17.1 by way of the main valve 9.1 and the bypass by way of the pilot chamber 26.1 and the pilot valve 8.1 to the consuming device, that is, the working chamber 19. During the full opening stroke of the main inlet valve 9.1, that is, of the closing body 14.1, this main inlet valve nevertheless forms a resistance for the fluid flow flowing from the inlet chamber to the consuming device. While observing the regulating times, the actuating magnet 5.1 of the first valve system is switched currentless again in time and the opening at the pilot valve device 8.1 is closed, which finally, with a rise of the pilot pressure, leads to the closing of the main valve 9.1, so that, with the closing of the main valve 9.1, the intended consuming device pressure is reached in the working chamber 19. For maintaining the consuming device pressure, the actuating magnet 5.2 of the second valve system 3 is energized and the actuating magnet of the first valve system 2 remains non-energized.

If the position of the pilot valve device 8.1 and 8.2 respectively is adjusted by means of an actuating magnet 5.1 and 5.2 respectively in the form of a proportional magnet, the opening cross-section of the pilot valve device 8.1 and 8.2 can be continuously changed. This opening cross-section virtually forms a controllable throttling device. However, the controllable throttle may also be replaced by a timed magnetic valve. In this case, the fluid volume in the pilot chamber 26.1 has a damping effect. By means of the changeable timing ratio, the pressure in the pilot chamber 26.1 can be adjusted to values between the input and the output pressure.

The lowering of the pressure in the inflow 22 to the consuming device takes place in a similar manner by means of the second valve system 3, particularly by way of the actuation of the actuating magnet 5.2. During this phase, the actuating magnet 5.1 of the first valve system 2 remains non-energized. By lowering the energizing at the actuating magnet 5.2 of the second valve system 3, the pilot valve 8.2, particularly the controllable throttle, is opened and the pressure from the pilot chamber 26.2 of the second valve system 3 is reduced. The main valve 9.2 opens and allows fluid to flow from the consuming device into the atmosphere. If the second valve system 3 is timed, the switching cycle and the timing ratio determine the pressure in the pilot chamber 26.2.

The pressurized surfaces acting at the closing bodies 14.1 and 14.2 respectively, in connection with the position and the width of the control ranges of the pilot valve device 8.1 and 8.2 respectively, have the effect that, in partial ranges, a pressure change in the chamber to the consuming device, that is, in the working chamber 19, is achieved only by way of the throttle 8.1 and 8.2 respectively. This permits a sensitive adaptation in the boundary areas.

The valve combination 1 illustrated in FIG. 1 is a functional combination of two valve systems 2 and 3 designed according to the invention. The individual valve systems 2 and 3 are preferably designed and laid out in an identical manner corresponding to the arrangement and further development of the individual valves—main valve and pilot valve. However, the combination creates the possibility that at least a separate partial insert element or a corresponding construction of a partial insert element as well as the connection lines between the two valve systems can be eliminated in that jointly utilized intermediate walls of, in each case, only one partial insert element or one insert are formed.

In the case of this particularly preferred embodiment as a result of the combination of the two valve systems 2 and 3, when further developing the inserts, a separate intermediate wall between the two valve systems can be eliminated. A large number of possibilities are available for this purpose, one being illustrated in FIG. 1 in a representative manner. This possibility has the advantage that the sealing device 42 can simultaneously be utilized as an interconnected sealing device in the form of a membrane for the construction of the second pilot chamber 26.2 of the second valve system 3. The transfer of the fluid from the pilot valves 8.1 or 8.2 constructed as controllable throttles to the corresponding outlet, that is, for valve system 2 to the working chamber 19, and for valve system 3, to a bleeding connection 24 or a bleeding chamber, takes place by way of passage openings 38 in the sealing device 42.1 and 42.2 respectively.

There is also the possibility of combining, with respect to its method of operation, the first valve system or the second valve system with other valve systems with the same method of operation.

The decisive factor is only that the construction of the first valve system or of the second valve system takes place such that a simple repair or a simple exchange of individual elements can take place without damaging other connection elements.

Figure 2:
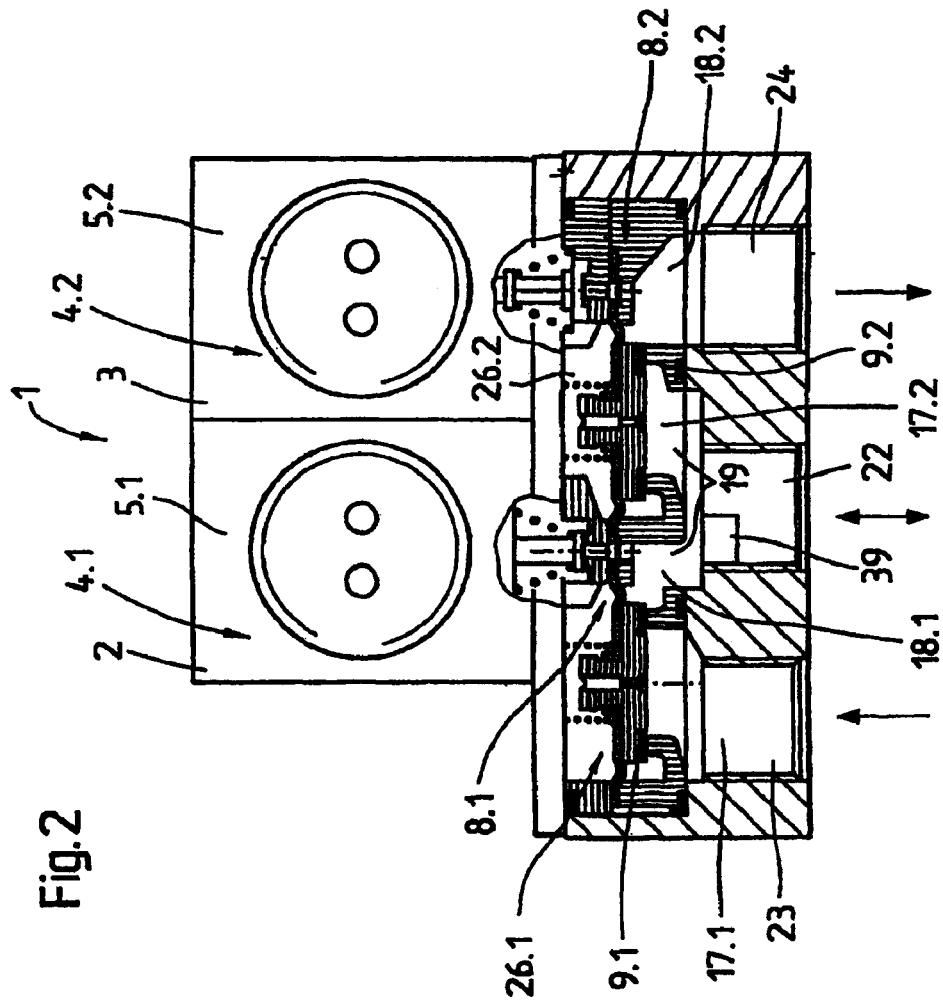
FIG. 2 illustrates an embodiment according to FIG. 1 with devices for detecting a condition parameter in the working chamber of the combined valve device.

According to another aspect of the invention, it is possible according to FIG. 2 to provide, in the case of the valve combination 1 illustrated in FIG. 1, a device 39 for sensing the pressure in the working chamber 19. This provides the possibility of offering a valve device 1 as an independently merchantable construction unit which can be provided while regulating the pressure on the consuming device without any additional expenditures.

Figure 3:
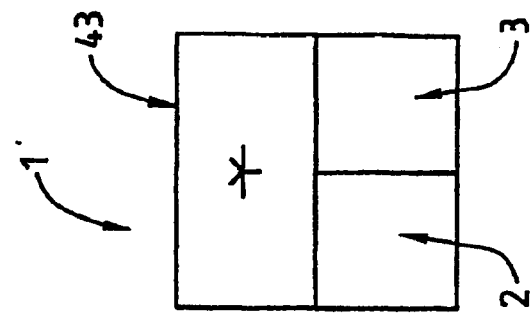
FIG. 3 illustrates an embodiment according to FIG. 1 with the integration of an electronic control unit.

As a further development of the device 1 according to FIG. 3, the possibility is also provided of integrating an electronic control unit 43 in the valve device 1. As a result, a pressure control module is provided which is largely independent of providing additional elements.

Table of Reference Numbers

| | |
|---|---|
| 1 | combined valve device |
| 2 | first valve system |
| 3 | second valve system |
| 4.1, 4.2 | devices for the electromagnetic actuation |
| 5.1, 5.2 | actuating magnet |

-continued

Table of Reference Numbers

| | |
|---|---|
| 6.1, 6.2 | armature |
| 7.1, 7.2 | pilot valve body |
| 8.1, 8.2 | pilot valve |
| 9.1, 9.2 | main valve |
| 10.1, 10.2 | main valve member |
| 11.1 | stationary seat of the main valve 9.1 |
| 11.2 | stationary seat of the main valve 9.2 |
| 12.1, 12.2 | pilot valve member |
| 13.1, 13.2 | supporting spring device |
| 14.1, 14.2 | closing body |
| 15.1, 15.2 | piston element |
| 16.1, 16.2 | shaft |
| 17.1 | inlet chamber of the first valve system 2 |
| 17.2 | inlet chamber of the second valve system 3 |
| 18.1 | outlet chamber of the first valve system 2 |
| 18.2 | outlet chamber of the second valve system 3 |
| 19 | working chamber |
| 20.1 | first connection of the first valve system 2 |
| 20.2 | first connection of the second valve system 3 |
| 21.1 | second connection of the first valve system 2 |
| 21.2 | second connection of the second valve system 3 |
| 22 | connection to the consuming device |
| 23 | intake |
| 24 | connection to the relief space |
| 25 | housing |
| 26.1, 26.2 | pilot chamber |
| 27.1, 27.2 | connecting duct |
| 28.1, 28.2 | partial area of the face oriented to the inlet chamber |
| 29.1 | face oriented to the inlet chamber 17.1 |
| 29.2 | face oriented to the inlet chamber 17.2 |
| 30.1 | face of closing body 14.1 pointing away from the inlet chamber |
| 30.2 | face of closing body 14.2 pointing away from the outlet chamber |
| 31.1, 31.2 | two-piece insert |
| 31.11 | first partial insert element of the first insert |
| 31.12 | second partial insert element of the first insert |
| 31.21 | first partial insert element of the second insert |
| 31.22 | second partial insert element of the second insert |
| 33 | covering element |
| 34 | housing base element |
| 35 | projection |
| 36 | partial surface |
| 37 | intermediate wall |
| 38.1, 38.2 | passage opening |
| 39 | device for detecting the pressure in the working chamber |
| 40.1, 40.2 | connecting duct |
| 41.1, 41.2 | outer circumference |
| 42.1, 42.2 | sealing device |
| 43 | control unit |

What is claimed is:

1. An electromagnetically actuated valve system, comprising:
    a housing;
    an electromagnetic actuator;
    a main valve, which is arranged between an inlet chamber and an outlet chamber and which comprises a main valve member and a stationary valve seat;
    a pilot chamber, the pilot chamber being connected by way of a pilot valve, comprising at least one pilot valve member and a valve body connected with the electromagnetic actuator, with the outlet chamber and, by way of at least one connecting duct with a duct cross-section which cannot be changed during the operation, with the inlet chamber;
    wherein the pilot chamber is assigned to the main valve member such that the main valve member, at least in a partial area of its surfaces oriented in a mutually opposed manner viewed in a flow direction of the pressure medium, is in each case acted upon by pressure existing in the inlet chamber and pressure existing in the pilot chamber;

wherein the pilot chamber is connected by way of at least one connecting duct extending through a structural element forming the main valve member with the inlet chamber, the structural element, which forms the main valve member, and the pilot valve member are free of a constructional coupling with one another;

further wherein the housing has a housing base element and a covering element in whose interior wall areas a multipart insert comprising at least a first partial insert element and a second partial insert element are supported;

viewed in the flow direction of the pressure medium from the inlet chamber, the second partial insert element being arranged behind the first partial insert element;

wherein the stationary seat of the main valve is constructed on the first partial insert element;

wherein the pilot valve member is integrated in the second partial insert element; and further wherein the connection between the pilot valve and the outlet chamber takes place by way of at least one connecting duct arranged in the insert.

2. The valve system according to claim 1, wherein the constructional element for forming the main valve member is formed by a closing body, which closing body comprises a piston-type end area and a shaft adjoining the latter.

3. The valve system according to claim 1, wherein sealing devices are provided on the mutually operatively connecting surface areas of the main valve member or the main valve seat and/or the pilot valve member or the pilot valve body.

4. The valve system according to claim 1, wherein the insert which can be inserted into the housing in a prestressable manner, is constructed in several parts and comprises at least a partial insert element, which is first viewed in the flow direction of the pressure medium from the inlet chamber, and a second partial insert element, which is arranged behind the first partial insert element.

5. The valve system according to claim 4, wherein the stationary main valve seat is constructed on the first partial insert element.

6. The valve system according to claim 4, wherein the first partial insert element has a first area which extends in the axial direction and comes to rest on the interior housing wall, and a second area which extends into the inlet chamber and forms the main valve seat.

7. The valve system according to claim 5, wherein the first partial insert element has a first area which extends in the axial direction and comes to rest on the interior housing wall, and a second area which extends into the inlet chamber and forms the main valve seat.

8. The valve system according to claim 1, wherein the pilot chamber is formed by an intermediate space existing between the closing body and the insert, which intermediate space is bounded by providing a sealing device between the closing body and the insert.

9. The valve system according to claim 8, wherein the pilot chamber is bounded by the second partial insert element of the insert and the closing body, and wherein the sealing device is arranged between the second partial insert element and the closing body.

10. The valve system according to claim 9, wherein the sealing device is constructed as a membrane which is fastened to the face of the main valve member pointing away from the inlet chamber, and is clamped in on one of the two partial insert elements or between the first and the second partial insert element.

11. The valve system according to claim 1, wherein the pilot chamber adjoins the pilot valve directly.

12. The valve system according to claim 1, wherein the actuator comprises at least one actuating magnet and an armature coupled with the latter.

13. The valve system according to claim 12, wherein at least one actuating magnet has an ascending stroke/current characteristic and is therefore pulling.

14. The valve system according to claim 12, wherein at least one actuating magnet has a descending stroke/current characteristic and is therefore pushing.

15. The valve system according to claim 13, wherein at least one actuating magnet has a descending stroke/current characteristic and is therefore pushing.

16. The valve system according to claim 1, wherein one sealing device respectively is provided between the insert and the housing walls.

17. The valve system according to claim 1, wherein the inlet chamber can be connected with a pressure medium source, and the outlet chamber forms a working chamber which can be coupled with a consuming device.

18. The valve system according to claim 1, wherein the inlet chamber is formed by a working chamber, which can be coupled with a consuming device, and the outlet chamber can be connected with a relief space.

19. A combined valve device, comprising:
a first electromagnetically actuated valve system; and
a second electromagnetically actuated valve system;
wherein said first electromagnetically actuated valve system has an inlet chamber connectable with a pressure medium source and an outlet chamber, forming a working chamber, which is coupleable with a consuming device; and
wherein the second electromagnetically actuated valve system has an inlet chamber formed by the working chamber, which is coupleable with the consuming device, and an outlet chamber connectable with a relief space.

20. The combined valve device according to claim 19, further comprising:
at least three connections coupled with the chambers of the valve systems;
the inlet chamber of the first valve system can be coupled with a pressure medium source;
the outlet chamber of the first valve system and the inlet chamber of the second valve system can be coupled with at least one consuming device; and
the outlet chamber of the second valve system is formed by a relief chamber which is coupled with a relief space.

21. The combined valve device according to claim 20, wherein the inlet chamber of the second valve system and the outlet chamber of the first valve system are formed by the working chamber which is assigned to both valve systems and which, by way of at least one connection, can be coupled with one or more consuming devices.

22. The combined valve device according to claim 21, wherein the connections to the consuming device are combined in a block.

23. The combined valve device according to claim 19, wherein an actuator and closing bodies of the two valve systems have identical constructions and dimensions.

24. The combined valve device according to claim 19, wherein partial insert elements of the two valve systems are constructed and designed such that they mutually support one another.

25. The combined valve device according to claim 24, wherein an intermediate wall between the two valve systems is in each case formed by one of the partial insert elements of the two valve systems.

26. The combined valve device according to claim 19, wherein the two valve systems have a common membrane for bounding pilot chambers between closing bodies and inserts.

27. The combined valve device according to claim 19, wherein a device for detecting pressure is arranged in the working chamber.

28. The combined valve device according to claim 19, wherein the combined valve device forms a constructional unit with a control unit.

29. An electromagnetically actuated valve system, comprising:

a housing;

an electromagnetic actuator;

a main valve arranged between an inlet chamber and an outlet chamber, the main valve comprising a main valve member and a stationary valve seat;

a pilot chamber, the pilot chamber being connected by way of a pilot valve comprising at least one pilot valve member and a valve body connected with the electromagnetic actuator, the outlet chamber, and, by way of at least one connecting duct having a constant duct cross-section in operation, the inlet chamber;

wherein the pilot chamber is assigned to the main valve member such that the main valve member, at least in a partial area of its valve surfaces oriented in a mutually opposed manner viewed in a flow direction of a pressure medium, is in each case acted upon by pressure existing in the inlet chamber and pressure existing in the pilot chamber;

wherein the pilot chamber is connected by way of the at least one connecting duct extending through a structural element forming the main valve member with the inlet chamber;

wherein the structural element and the pilot valve member are constructionally uncoupled from one another;

wherein a stationary seat of the main valve is formed by an insert, which insert is clampable into the housing; and wherein the pilot valve member is formed by the insert, a connection between the pilot valve and the outlet chamber taking place by way another connecting duct arranged in the housing or the insert.

30. A combined valve device, comprising:

first and second electromagnetically actuated valve systems, each valve system comprising:

a housing;

an electromagnetic actuator;

a main valve arranged between an inlet chamber and an outlet chamber, the main valve comprising a main valve member and a stationary valve seat;

a pilot chamber, the pilot chamber being connected by way of a pilot valve comprising at least one pilot valve member and a valve body connected with the electromagnetic actuator, the outlet chamber, and, by way of at least one connecting duct having a constant duct cross-section in operation, the inlet chamber;

wherein the pilot chamber is assigned to the main valve member such that the main valve member, at least in a partial area of its valve surfaces oriented in a mutually opposed manner viewed in a flow direction of a pressure medium, is in each case acted upon by pressure existing in the inlet chamber and pressure existing in the pilot chamber;

wherein the pilot chamber is connected by way of the at least one connecting duct extending through a structural element forming the main valve member with the inlet chamber;

wherein the structural element and the pilot valve member are constructionally uncoupled from one another;

wherein a stationary seat of the main valve is formed by an insert, which insert is clampable into the housing; and wherein the pilot valve member is formed by the insert, a connection between the pilot valve and the outlet chamber taking place by way another connecting duct arranged in the housing or the insert; and wherein the inlet chamber of the first valve system is connectable with a pressure medium source and the outlet chamber of the first valve system forms a working chamber coupleable with a consuming device; and wherein the inlet chamber of the second valve system is formed by the working chamber, which is coupleable with the consuming device, and the outlet chamber of the second valve system is connectable with a relief space.

* * * * *